W. P. ELKIN.
HEMP BREAKING MACHINE.
APPLICATION FILED JUNE 21, 1916.
1,204,260.
Patented Nov. 7, 1916.
3 SHEETS—SHEET 2.
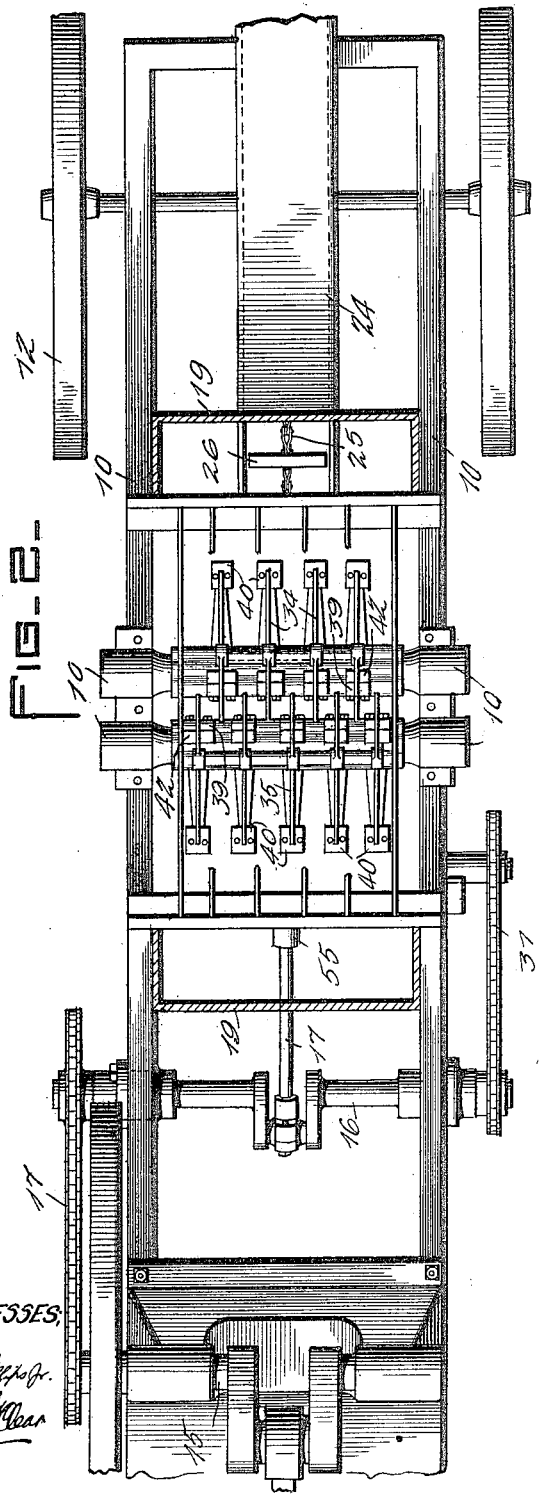
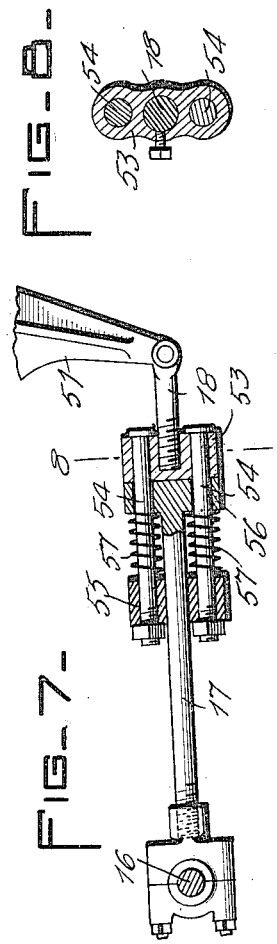
WITNESSES:
INVENTOR
WARREN P. ELKIN,
BY
ATTORNEYS

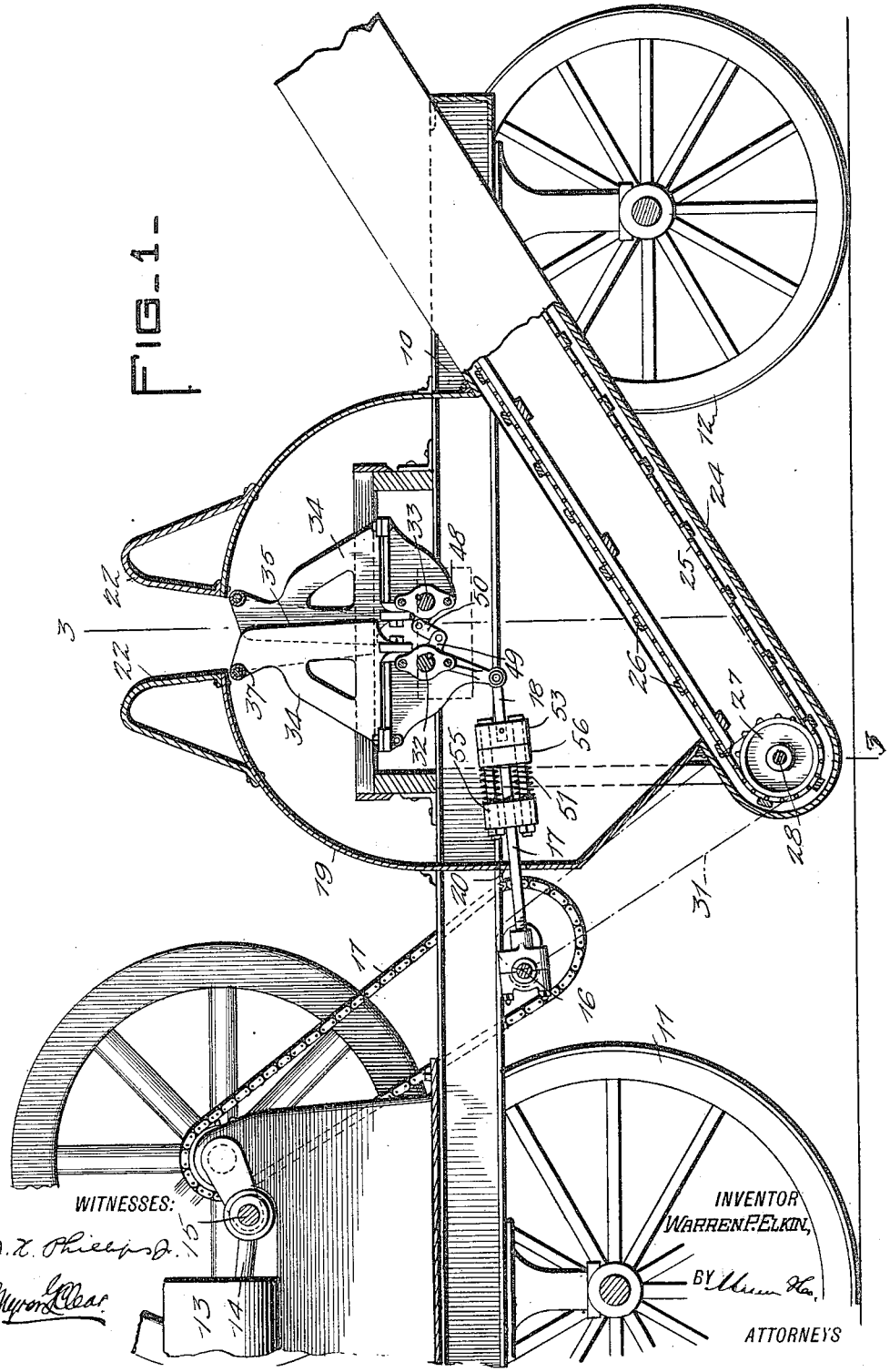

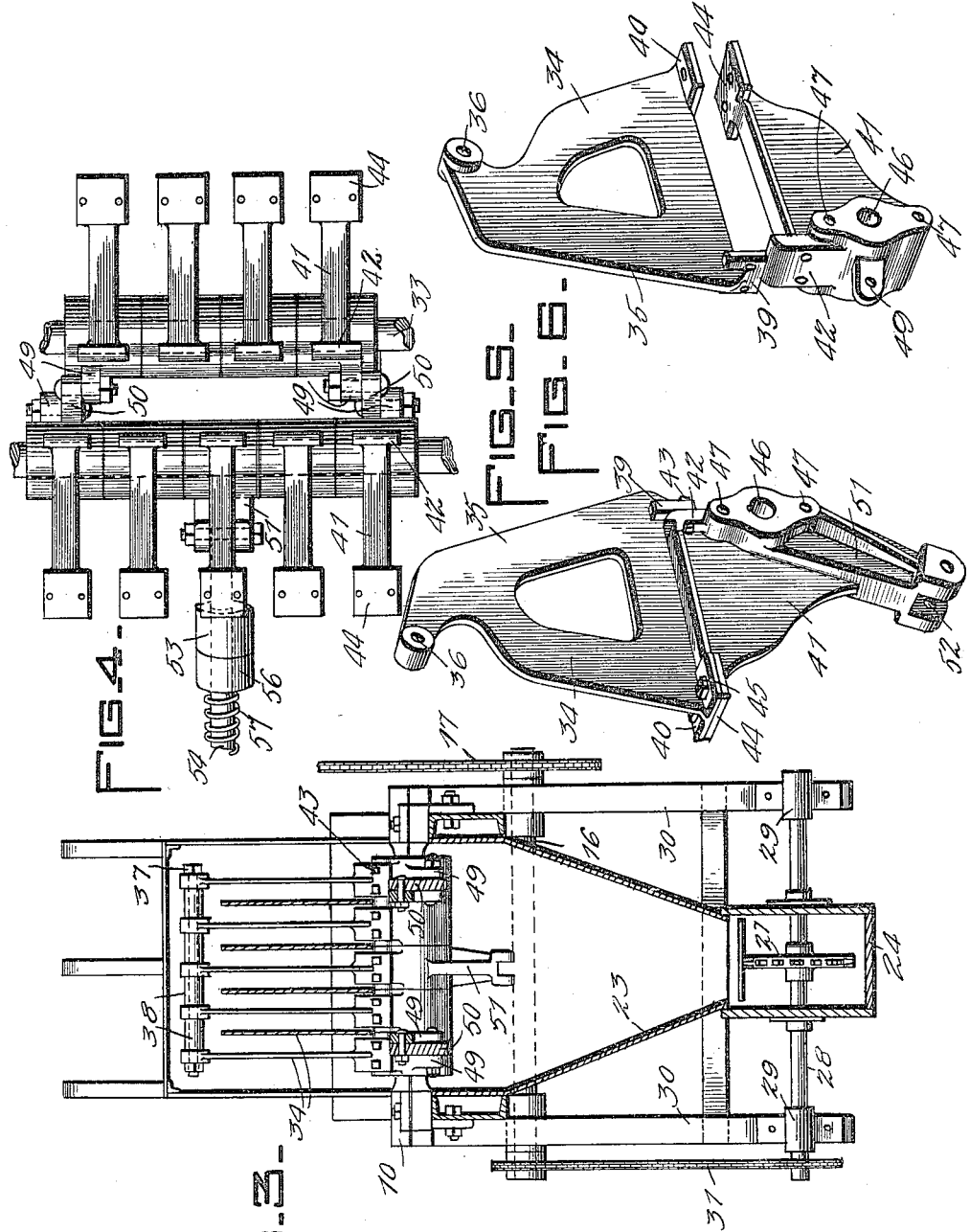

UNITED STATES PATENT OFFICE.

WARREN PRICE ELKIN, OF WINCHESTER, KENTUCKY.

HEMP-BREAKING MACHINE.

1,204,260. Specification of Letters Patent. Patented Nov. 7, 1916.

Application filed June 21, 1916. Serial No. 104,981.

*To all whom it may concern:*

Be it known that I, WARREN P. ELKIN, a citizen of the United States, and a resident of Winchester, in the county of Clark and State of Kentucky, have invented a certain new and useful Improvement in Hemp-Breaking Machines, of which the following is a specification.

My present invention relates generally to hemp breaking machines, and more particularly to a portable machine of this character, including a simple, compact, and durable arrangement for the purpose having certain novel structures and combinations of parts as hereinafter more particularly described with reference to the accompanying drawings, forming a part of this specification, and in which—

Figure 1 is a vertical longitudinal section through my improvement. Fig. 2 is a top plan view thereof. Fig. 3 is a vertical cross section taken substantially on line 3—3 of Fig. 1. Fig. 4 is a plan view of the several knife brackets with the knives removed. Fig. 5 is a detail perspective view of one of the knives and its supporting bracket. Fig. 6 is a similar view of another knife and its supporting bracket. Fig. 7 is a detail sectional view through the crank shaft pitman connecting the crank shaft with the series of knives, and Fig. 8 is a detail section therethrough substantially on line 8—8 of Fig. 7.

Referring now to these figures, my invention contemplates the provision of a readily portable frame 10 substantially rectangular in form and carried upon wheels 11 and 12 at the forward and rear ends thereof, a suitable prime mover generally indicated at 13, being mounted upon the forward portion of the frame, with its pitman 14 driving a crank shaft 15 in turn connected with another transverse crank shaft 16 by a sprocket and chain connection 16ᵃ, the last mentioned crank shaft being, as plainly seen in Fig. 1, journaled below the frame 10 rearwardly of the forward wheels 11 thereof.

Leading rearwardly from the crank portion of the crank shaft 16 is a pitman including rods 17 and 18 projecting into a casing 19 through a forward opening 20 of the casing, the casing having an upper intake opening 21 into which the hemp is introduced having guides 22 upon relatively opposite sides thereof, and said casing also having a tapering hopperlike base portion 23, as seen in Fig. 3, beneath the frame 10, the lower end of which discharges into a conveyer housing 24 inclined upwardly and rearwardly with its rear end above the frame 10.

In the conveyer housing 24 travels an endless conveyer 25 having spaced flights 26 and having its lower end extending around a single sprocket wheel 27 mounted upon a transverse shaft 28, the outer ends of which project beyond the housing 24 and are journaled as at 29 in Fig. 3 upon the lower ends of depending portions 30 of the main frame 10, one end of shaft 28 being connected by a sprocket and chain connection 31, to one end of the crank shaft 16 before mentioned, as plainly seen in Figs. 2 and 3.

Journaled in transverse parallel relation within the casing 19 and between and upon the side bars of the main frame 10, are a pair of shafts 32 and 33, each supporting a series of knives 34, the series alternating in spaced relation with respect to one another and being located as shown in Fig. 1 beneath the intake opening 21 of the casing.

In operation the shafts 32 and 33 are oscillated to move the two series of knives in opposition to one another, and in lapping relation to break the hemp introduced through the intake opening 21, the stalks being caught between the knives and broken and crushed in such manner as to completely separate the lint from the herd or stalk, the herd or stalk after being broken up and separated from the lint, dropping down through the hopper-like lower portion 23 of the casing and into the conveyer and being carried upwardly and rearwardly by the conveyer 25.

The adjacent opposing edges 35 of the several knives are slightly inclined and square as shown particularly in Figs. 5 and 6, each of the knives being also provided with an upper transverse bearing 36 whereby to receive therethrough connecting rods 37 by which the upper portions of the knives of each of the series are rigidly connected, the rods being bolted in place as shown in Fig. 3 with thimbles 38 thereon between the bearing portions 36 of the several blades.

The lower forward portion of each of the knives 34 is provided with a depending apertured lug 39 and the lower rear portion thereof is provided with laterally disposed apertured lugs 40, these lugs 39 and 40 providing for the rigid though detachable connection of the knives to the supporting stumps or brackets 41 having at their upper forward portions apertured lugs 42 to which lugs 39 are connected by bolts 43 and having transverse apertured lugs 44 at their upper rear portions to which the lugs 40 of the knives are bolted by bolts 45.

The lower forward portion of each of the stumps or brackets 41 has a transverse bearing 46 for the respective shafts 32 and 33, and is provided with apertures above and below its bearing 46 so that the several brackets or stumps 41 of each series may be rigidly connected in contacting series by means of rods 48 extending through the apertures 47 of the series and bolted thereto.

As seen in Figs. 1, 4, and 6 in particular, the outer stumps or brackets 41 of the two series are provided with apertured lugs 49 inclined toward one another in parallel planes, and connected by links 50 so as to communicate movement from one shaft to the other, for instance from shaft 32 to shaft 33, the central stump or bracket 41 of shaft 32, as seen in Fig. 5, being provided with a depending forwardly inclined integral arm 51, to the lower end of which the rear end of the rearmost pitman rod 18 is pivotally connected at 52. Thus rotary movement at the crank shaft 16 is communicated in the nature of oscillatory movement to the shafts 32 and 33 in order to effect movement of the breaking knives 34 as before described, forward longitudinal movement of the pitman, including rods 17 and 18, corresponding to the movements of the knives 34 toward one another, and thus corresponding to the breaking movement of the knives, to which end the rods 17 and 18 of the pitman are flexibly connected so that the two series of knives may yield under excess strain and obviate breaking and cracking. Thus the forward end of the rearmost rod 18 of the pitman is rigidly connected to a cross head 53, through which project the rear headed ends of guide bolts 54. The forward ends of the guide bolts 54 are secured to opposite sides of a cross head 55 centrally through which is movable the forward rod 17 of the pitman, the rear end of which rod is rigid with a cross head 56 disposed between the cross heads 53 and 55 and through which the guide bolts 54 also pass. Springs 57 are coiled about the guide bolts 54 and compressed between the cross heads 55 and 56 so that, in forward longitudinal movement of the pitmen, the forward rods 17 thereof may yield with respect to the rod 18.

It is obvious from the foregoing that I provide a compact arrangement, readily portable in use, and capable of effective arrangement at all times.

It is also obvious that I provide a simple, strong, and durable arrangement, as well as one requiring but minimum attention and skill during its action.

I claim:—

1. In a hemp breaking machine, opposing series of spaced alternating knives, movable toward and away from one another, each knife having a bearing adjacent its upper end, and a connecting member extending through said bearings of each series of knives and rigidly connecting the knives thereof.

2. In a hemp breaking machine, a pair of spaced parallel oscillatory shafts, knife brackets secured in rigid series on each shaft and having apertured lugs extending toward one another in parallel planes, links connecting said lugs, knives detachably secured upon said brackets, and means for oscillating one of said shafts.

3. In a hemp breaking machine, a pair of spaced parallel oscillatory shafts, knife brackets secured in rigid series on each shaft and having apertured lugs at their upper forward and rear portions, knives having lugs at their lower forward and rear portions bolted to the lugs of the brackets, and means for oscillating the said shafts.

4. In a hemp breaking machine, a pair of spaced parallel oscillatory shafts, knife brackets secured thereon in rigid series, knives detachably connected at their lower ends to the brackets and arranged in spaced relation along each shaft, the knives of the two shafts alternating with one another, and means for connecting the upper portions of the knives of each series in rigid spaced relation.

5. In a hemp breaking machine, a pair of spaced parallel oscillatory shafts, knife brackets secured thereon in rigid series, knives detachably connected at their lower ends to the brackets and arranged in spaced relation along each shaft, the knives of the two shafts alternating with one another, and means for connecting the upper portions of the knives of each series in rigid spaced relation, said means consisting of bolts extending through the upper portions of the knives of each series, and thimbles encircling the bolts and disposed between the knives.

6. In a hemp breaking machine, opposing series of spaced alternating knives, a pair of parallel oscillatory shafts, a series of knife brackets secured upon each shaft and to which the knives are detachably connected, one of said knife brackets of one series having a rigid depending arm, connections between the two series of knife brackets whereby to communicate movement therebetween, a crank shaft, means for rotating the crank shaft, and a pitman connecting the crank shaft with the said depending bracket arm.

7. In a hemp breaking machine, opposing series of spaced alternating knives, a pair of parallel oscillatory shafts, a series of knife brackets secured upon each shaft and to which the knives are detachably connected, one of said knife brackets of one series having a rigid depending arm, connections between the two series of knife brackets whereby to communicate movement therebetween, a crank shaft, means for rotating the crank shaft, and a pitman connecting the crank shaft with the said depending bracket arm, said pitman including alined rods and yielding connections between the rods for the purpose described.

WARREN PRICE ELKIN.

Copies of this patent may be obtained for five cents each, by addressing the "Commissioner of Patents, Washington, D. C."